United States Patent
Helbing et al.

(10) Patent No.: US 7,400,826 B2
(45) Date of Patent: Jul. 15, 2008

(54) IMAGING DEVICE AND METHOD FOR PRODUCING A FLASH OF LIGHT WITH PULSING

(75) Inventors: Rene P. Helbing, Palo Alto, CA (US); Gim Eng Chew, Penang (MY); Janet Bee Yin Chua, Perak (MY); Wooi Kin Goon, Penang (MY); Thye Linn Mok, Penang (MY); Kee Yean Ng, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 347 days.

(21) Appl. No.: 11/215,609

(22) Filed: Aug. 29, 2005

(65) Prior Publication Data

US 2007/0047946 A1    Mar. 1, 2007

(51) Int. Cl.
*G03B 15/03* (2006.01)
*F21V 9/00* (2006.01)

(52) U.S. Cl. .............. 396/164; 396/182; 362/231
(58) Field of Classification Search .............. 396/182, 396/155, 164; 362/11, 231; 348/370–371
See application file for complete search history.

(56) References Cited

U.S. PATENT DOCUMENTS

| 5,010,412 | A | 4/1991 | Garriss | |
|---|---|---|---|---|
| 6,379,022 | B1 * | 4/2002 | Amerson et al. | 362/231 |
| 7,071,989 | B2 * | 7/2006 | Nakata | 348/371 |
| 7,106,378 | B2 * | 9/2006 | Kawakami | 348/371 |
| 7,209,652 | B2 * | 4/2007 | Uenaka | 396/182 |
| 2005/0078477 | A1 | 4/2005 | Lo | |

* cited by examiner

*Primary Examiner*—Christopher E Mahoney

(57) ABSTRACT

An imaging device and method for producing a flash of light utilizes pulsing of one or more color lights, e.g., red, green and blue lights, emitted from light sources to produce the flash of light. The light sources may include light emitting diode dies configured to generate different color lights.

18 Claims, 6 Drawing Sheets

IMAGING DEVICE AND METHOD FOR PRODUCING A FLASH OF LIGHT WITH PULSING

BACKGROUND OF THE INVENTION

Electronic flashes provide supplemental light for photography to enhance images captured by a camera or other imaging devices. Traditional electronic flashes utilize a bulb filled with gas, such as argon, krypton, neon and xenon, or vapor, such as mercury vapor. When a high voltage is applied to the bulb, the gas or vapor is ionized, allowing electrons to flow through the gas or vapor. These electrons excite the atoms of the gas or vapor, which emit light. The wavelength characteristics of the emitted light depends on the gas or vapor in the bulb. In the case of mercury vapor, the emitted light is ultraviolet light, which is usually converted to visible light using fluorescent material since ultraviolet light is typically not desired.

Recently, light emitting diodes ("LEDs") have been improved to a point with respect to operating efficiency where LEDs are now replacing conventional light sources, even bulbs in electronic flashes. Existing LEDs can emit light in the ultraviolet ("UV"), visible or infrared ("IR") wavelength range. These LEDs generally have narrow emission spectrum (approximately +/−10 nm). As an example, a blue InGaN LED may generate light with wavelength of 470 nm +/−10 nm. As another example, a green InGaN LED may generate light with wavelength of 510 nm +/−10 nm. As another example, a red AlInGaP LED may generate light with wavelength of 630 nm +/−10 nm. However, since electronic flashes typically need to produce white light for color rendering purposes, different color LEDs such as red, blue and green LEDs are used together in an electronic flash to produce a white flash of light.

LED electronic flashes are commonly used in compact digital cameras with complementary metal oxide semiconductor (CMOS) image sensors. In these CMOS cameras, the LEDs of the electronic flashes are driven in continuous mode during an integration (exposure) period, i.e., the LEDs are turned on for the entire integration period. However, due to their architecture, CMOS cameras read out information sequentially, pixel row by pixel row. Hence, only after the image information in one pixel row is read out, the information in the next pixel row is read out. As a result, the integration time for each pixel row is staggered in order to maintain the same integration time for all the pixels in the CMOS image sensor to capture an entire image.

FIG. 1 illustrates the staggered integration technique to sequentially read out information from pixels rows 10(1), 10(2), 10(3) . . . 10(N-2), 10(N-1) and 10(N) of a CMOS image sensor. In FIG. 1, the integration time 12 and the readout time 14 for each pixel row of the CMOS image sensor are shown. As shown in FIG. 1, the readout time 14 for each pixel row begins after the end of the readout time for a previous pixel row, except for the first pixel row 10(1). Consequently, the integration time 12 for each pixel row is staggered with respect to adjacent pixel rows so that the integration time is the same for all the pixel rows. Therefore, the total integration period to capture an entire image begins when the integration time 12 for the first pixel row 10(1) begins at t=t1 and ends when the integration time for the last pixel row 10(N) ends at t=tn.

Since LEDs of an electronic flash for a CMOS camera are driven in continuous mode, the LEDs must be turned on during the entire integration period to produce a flash of light 16 with a predefined intensity I. However, as shown in FIG. 1, the light 16 from the LEDs of the electronic flash is not used by most of the pixel rows of the CMOS sensor near the beginning and the end of the integration period. For example, from t=t1 to t=t2, the light 16 from the LEDs of the electronic flash is used only by the pixel row 10(1) of the CMOS image sensor. Thus, the light 16 from the LEDs of the electronic flash is not used efficiently for the CMOS image sensor.

In view of this concern, there is a need for an imaging device and method for producing a flash of light using LEDs that more efficiently uses the light generated by the LEDs.

SUMMARY OF THE INVENTION

An imaging device and method for producing a flash of light utilizes pulsing of one or more color lights, e.g., red, green and blue lights, emitted from light sources to produce the flash of light. The light sources may include light emitting diode dies configured to generate different color lights. The pulsing of one or more color lights allows the lights to be used more efficiently when using an imaging sensor with serial pixel row read out architecture.

A method for producing a flash of light in accordance with an embodiment of the invention comprises generating first color light during an integration period, generating second color light during the integration period, and generating at least one pulse of third color light during the integration period. The pulse of third color light has a pulse width shorter than the integration period. The first color light, the second color light and the at least one pulse of third color light are components of the flash of light.

A method for producing a flash of light in accordance with another embodiment of the invention comprises continuously generating first color light having a first intensity during an integration period, continuously generating second color light having a second intensity during the integration period, and generating at least one pulse of third color light having a third intensity during the integration period. The pulse of third color light has a pulse width shorter than the integration period. The third intensity of the at least one pulse of third color light is higher than the first intensity of the first color light and the second intensity of the second color light. The first color light, the second color light and the at least one pulse of third color light are components of the flash of light.

An imaging device in accordance with an embodiment of the invention comprises an electronic flash, a flash controller and an image sensor. The electronic flash is configured to produce a flash of light. The electronic flash comprises a housing structure and first, second and third light sources, which are connected to the housing structure. The first light source is configured to generate first color light during an integration period. The second light source is configured to generate second color light during the integration period. The third light source is configured to generate third color light. The flash controller is operatively connected to the first, second and third light sources of the electronic flash to activate the first, second and third lights sources. The flash controller is configured to activate the third light source of the electronic flash to generate at least one pulse of third color light during the integration period. The pulse of third color light has a pulse width shorter than the integration period. The image sensor is configured to electronically capture an image of a scene of interest during the integration period.

Other aspects and advantages of the present invention will become apparent from the following detailed description, taken in conjunction with the accompanying drawings, illustrated by way of example of the principles of the invention.

DETAILED DESCRIPTION

Figure 2:
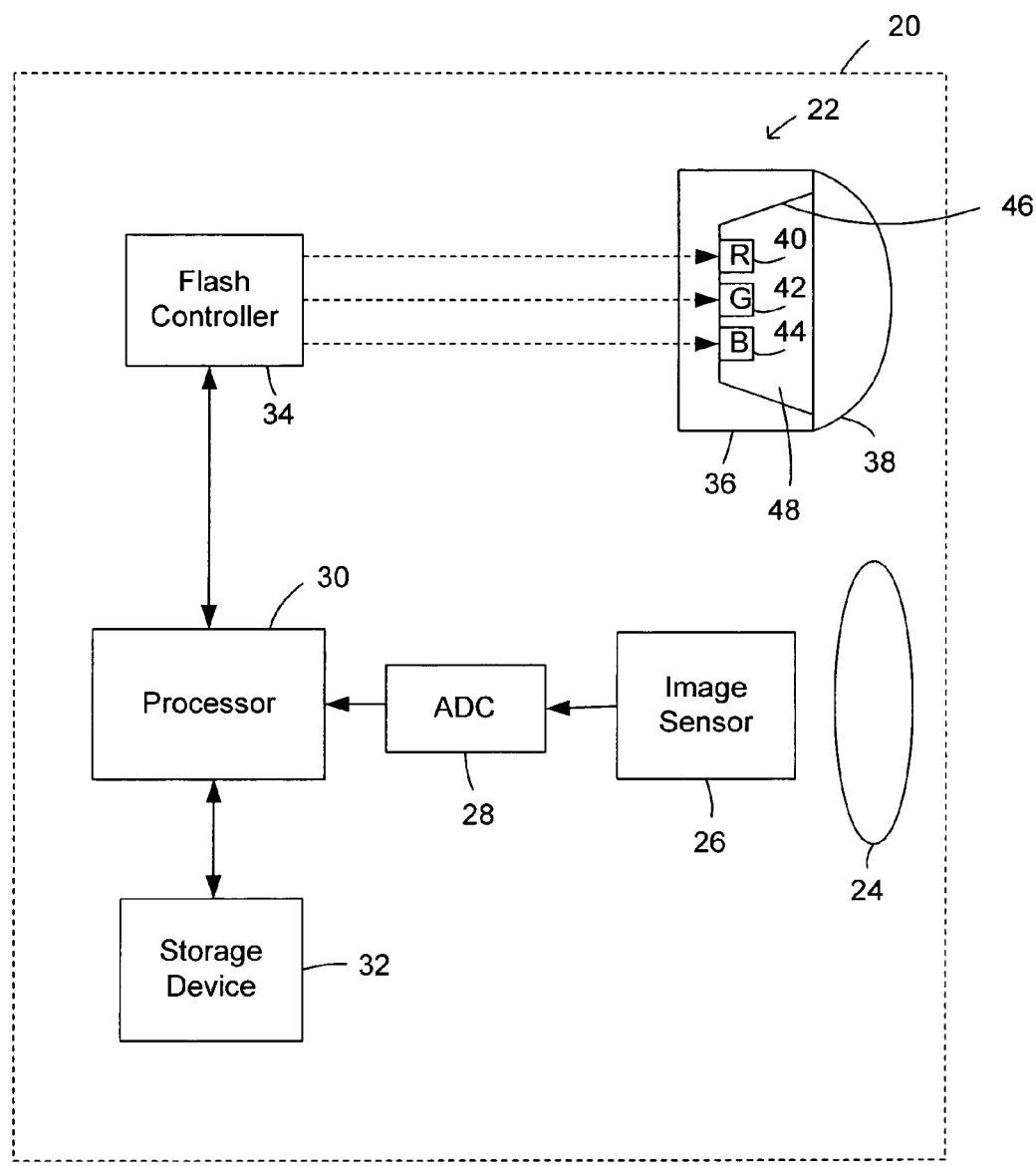
FIG. 2 is a diagram of a digital imaging device in accordance an embodiment of the invention.

With reference to FIG. 2, a digital imaging device 20 in accordance with an embodiment of the invention is described. The digital imaging device 20 may be any type of a device that can electronically capture an image of a scene of interest, such as a digital still camera or a camera phone. As described in more detail below, the digital imaging device 20 includes a light emitting diode (LED) electronic flash 22, which is operated to more efficiently use the light generated by the LED flash to capture images in lighting conditions when external light is desired.

As shown in FIG. 2, the digital imaging device 20 includes a lens 24, an image sensor 26, an analog-to-digital converter (ADC) 28, a processor 30, a storage device 32, a flash controller 34 and the LED flash 22. The digital image device 20 may also include other components commonly found in a conventional digital image, which are not illustrated or described herein so that the inventive features of the digital imaging device are not obscured. The lens 24 is used to focus a scene of interest onto the image sensor 26 to capture an image of that scene. The image sensor 26 electronically captures the image by accumulating an electrical charge at each pixel of the image sensor in response to received light at that pixel during an integration or exposure period. As an example, the image sensor 26 may be a complementary metal oxide semiconductor (CMOS) sensor. In this embodiment, the architecture of the image sensor 26 is such that the accumulated electrical charges from all the pixels of the image sensor 26 are sequentially read out on a row-by-row basis. The process of accumulating and reading out electrical charges from the pixels of the image sensor 26 is described in more detail below. The readout electrical charges are transmitted to the ADC 28, where the electrical charges are converted to digital signals for signal processing.

The processor 30 of the imaging device 20 processes the digital signals from the ADC 28 to produce a digital image of the captured scene of interest. The processes performed by the processor 30 may include demosaicing, image enhancements and compression. The resulting digital image is stored in the storage device 32, which may include a removable memory card. The processor 30 may also control various components of the imaging device 20, such as the image sensor 26 and the LED flash 22 via the flash controller 34.

The LED flash 22 includes a housing structure 36, an optically transparent cover 38, and LED light sources 40, 42 and 44. The housing structure 36 provides structural support for the LED light sources 40, 42 and 44. The housing structure 36 may include a reflective surface 46 to reflect some of the light generated by the LED light sources 40, 42 and 44 toward the optically transparent cover 38 so that most of the light generated by the LED light sources can be transmitted through the cover as useful flash of light. The optically transparent cover 38 may be shaped as a lens to direct the light emitted from the LED light sources 40, 42 and 44 to produce a more focused flash of light.

The LED light sources 40, 42 and 44 of the LED flash 22 are mounted on the reflective surface 46 of the housing structure 36. The LED light sources 40, 42 and 44 can be packaged LEDs or LED dies. The LED light sources 40, 42 and 44 may be encapsulated in an encapsulant 48. In an embodiment, the optically transparent cover 38 is an integral part of the encapsulant 48. The encapsulant 48 can be made of any transparent material, such as epoxy, silicone, a hybrid of silicone and epoxy, amorphous polyamide resin or fluorocarbon, glass and/or plastic material. Each of the LED light sources 40, 42 and 44 is configured to emit a particular color light. In an embodiment, the LED light sources 40, 42 and 44 are configured emit red light, green light and blue light, respectively, so that white flash of light is produced from the mixing of the emitted red, green and blue lights. As an example, the LED light source 40 may be an InGaAs (Indium Gallium Arsenide)-based LED light source, and the LED light sources 42 and 44 may be InGaN (Indium Gallium Nitride)-based LED light sources. In other embodiments, the LED light sources 40, 42 and 44 may be configured to emit different color lights, which may produce white flash of light when mixed.

The flash controller 34 of the imaging device 20 is electrically connected to the LED light sources 40, 42 and 44 of the LED flash 22. The flash controller 34 provides driving signals to the LED light sources 40, 42 and 44 during an integration period to activate each of the LED light sources to emit a particular color light. The emitted lights from the LED light sources 40, 42 and 44 produce a flash of light, which may be a white flash of light. The flash controller 34 is configured to control the activation of the LED light sources 40, 42 and 44 during an integration period so that the emitted light is used more efficiently, as described below.

Figure 1:
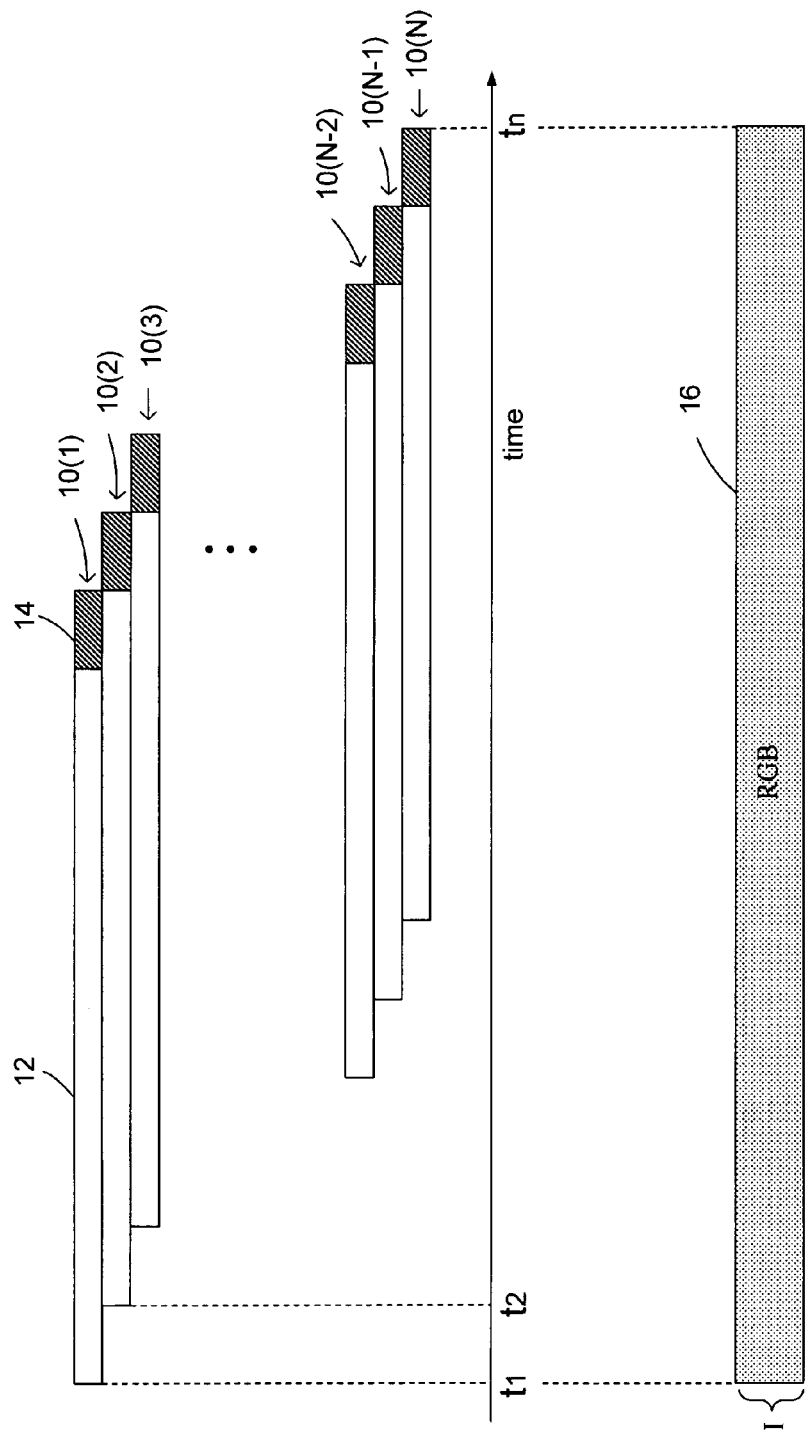
FIG. 1 illustrates the correlation between staggered integration times of pixel rows of an image sensor and generation of red, green and blue lights emitted from light emitting diodes (LEDs) of an electronic flash to produce a flash of light in accordance with the prior art.
Figure 3:
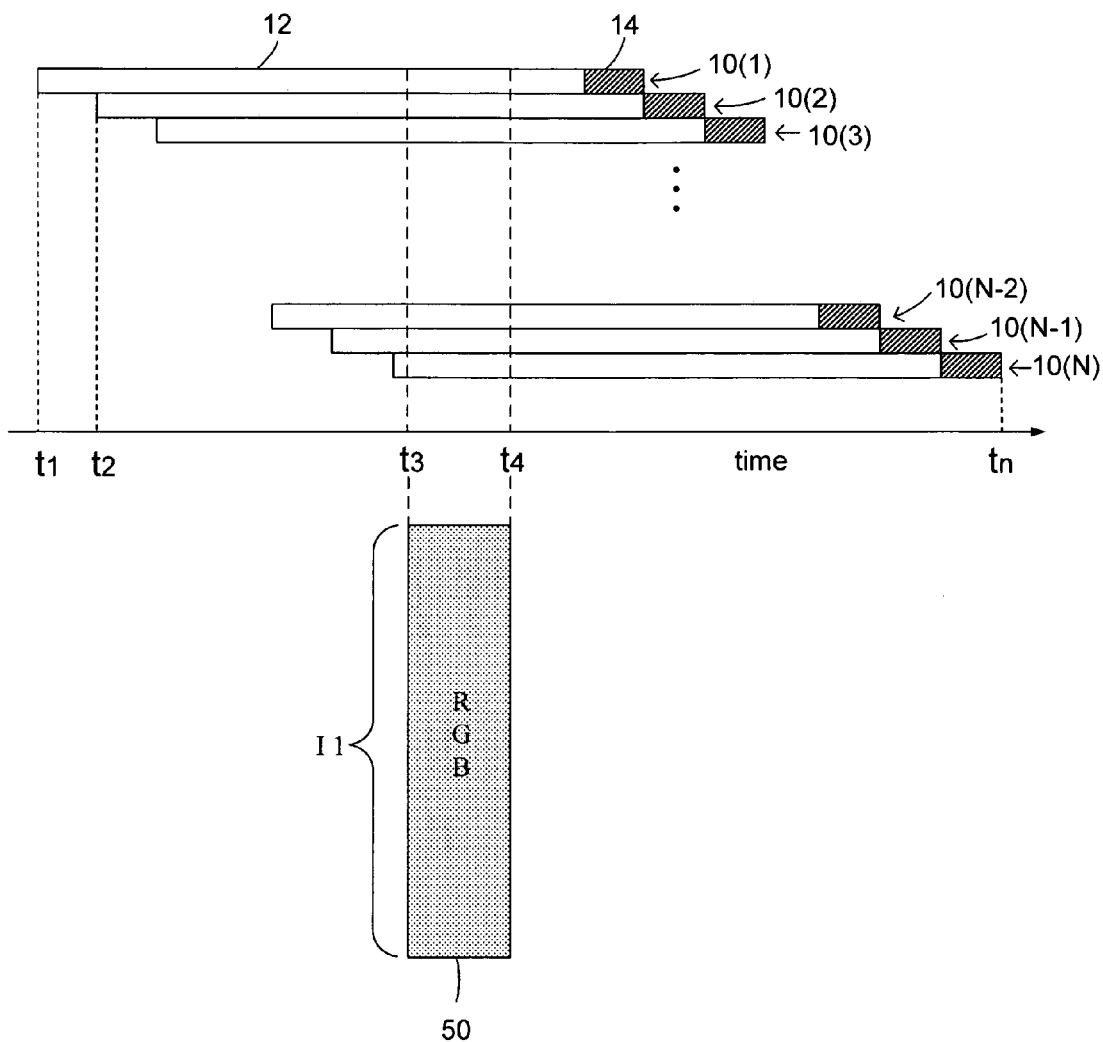
FIG. 3 illustrates pulsing red, green and blue lights emitted from LED light sources to produce a flash of light in accordance with an embodiment of the invention.

As illustrated in FIG. 1, when LEDs of a conventional electronic flash are driven in continuous mode for the full duration of an integration period, a significant portion of the flash of light is not used by the pixel rows of an image sensor due to the staggered integration time for each of the pixel rows of the image sensor. However, if the LEDs are driven such that the LEDs collectively emit pulses of light during a common period of all integration times of the pixel rows, then all of the emitted light will be used by the pixel rows of the image sensor. This is illustrated in FIG. 3. In FIG. 3, the integration time 12 and the readout time 14 for each of the pixel rows 10(1), 10(2), 10(3) . . . 10(N-2), 10(N-1) and 10(N) of the image sensor 26 are shown. The total integration period to capture an entire image begins when the integration time for the first pixel row 10(1) begins at t=t1 and ends when the integration time for the last pixel row 10(N) ends at t=tn. If the LED light sources 40, 42 and 44 of the LED flash 22 are driven by the flash controller 34 during a short common period, e.g., t3 to t4, to produce red, green and blue pulses of light 50 (collectively shown in FIG. 3), then all of the light emitted from the LED light sources 40, 42 and 44 will be used during the integration time for each of the pixel rows 10(1), 10(2), 10(3) . . . 10(N-2), 10(N-1) and 10(N). Thus, the width (t4-t3) of the red, green and blue pulses 50 of light is significantly shorter than the integration period.

In order to produce the required exposure energy from the pulses of light 50, the intensity of the light emitted from the LED light sources 40, 42 and 44 must be increased with higher driving signals, e.g., higher driving currents, to produce a flash of light with a higher intensity I1 than the intensity I of a conventional flash of light 16. However, in certain types of LED light sources, the light output efficiency actually decreases with very high driving signals, such as InGaN-based LED light sources that emit blue or deep green light. However, this is not the case for other types of LED light sources, such as InGaAs-based LED light sources that emit red and yellow-green light. Thus, if one or more of the LED light sources 40, 42 and 44 have the former property, then those LED light sources should not be operated to produce a pulse of light. Rather, these LED light sources need to be operated in continuous mode using standard driving signals.

Figure 4:
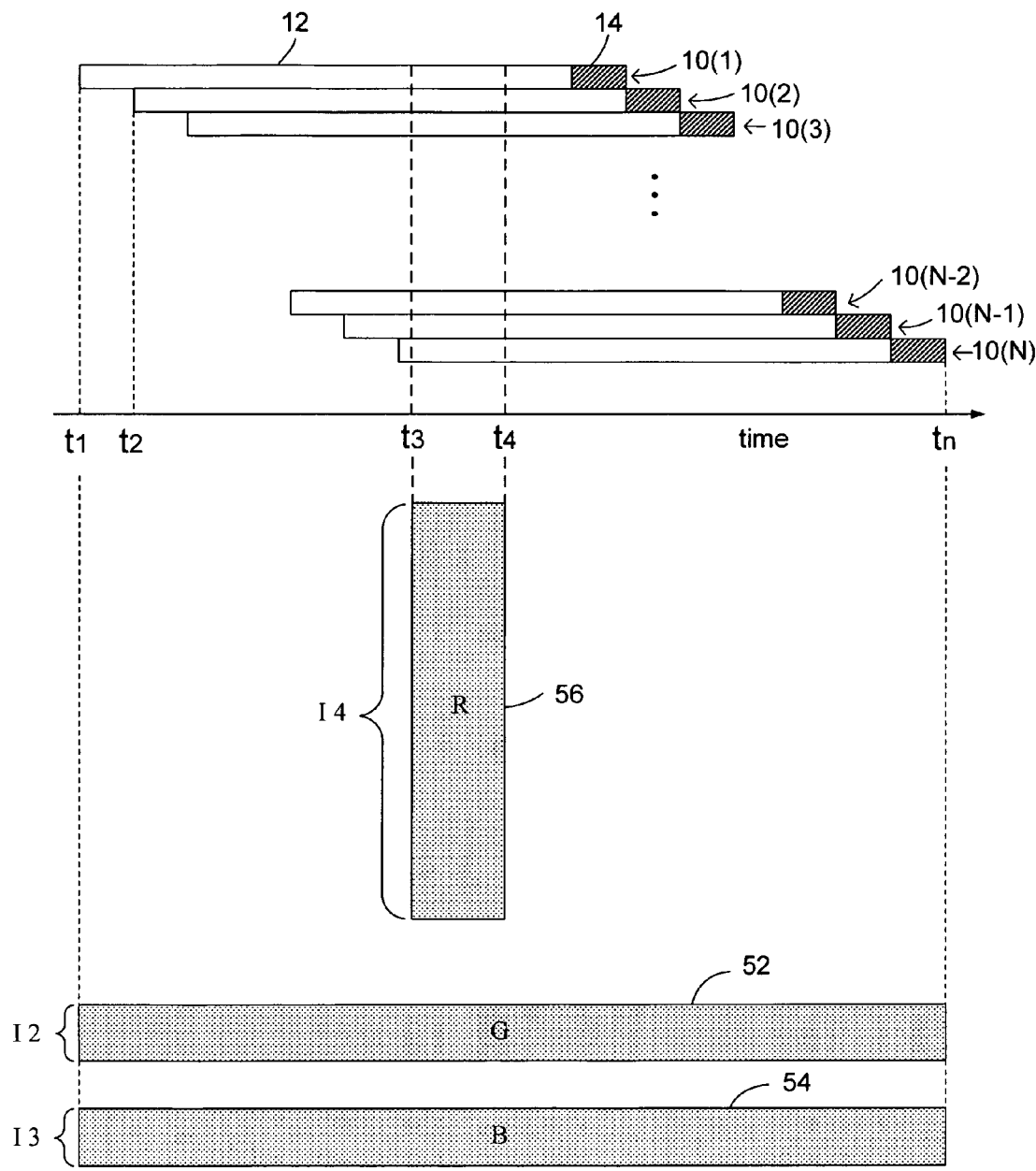
FIG. 4 illustrates pulsing only the red light emitted from a LED light source to produce a single pulse of red light during an integration period to produce a flash of light in accordance with another embodiment of the invention.

In an embodiment, as illustrated in FIG. 4, the flash controller 34 drives the LED light source 42 in continuous mode during an entire integration period to emit green light 52 with intensity I2. Similarly, the flash controller 34 also drives the LED light source 44 in continuous mode during the same entire integration period to emit blue light 54 with intensity I3, which may be substantially equal to the intensity I2. However, the flash controller 34 drives the LED light source 40 in a pulse mode during the integration period to emit a pulse of red light 56 with intensity I4, which is significantly higher than the intensity I2 of the emitted green light 52 and the intensity I3 of the emitted blue light 54. As an example, the intensity I4 of the pulse of red light 56 may be many times the intensity I2 of the emitted green light 52 or the intensity I3 of the emitted blue light 54. Again, the width (t4-t3) of the pulse of red light 56 is substantially shorter than the integration period. As an example, the entire integration period may be tens of milliseconds, while the pulse width of the red light 56 may be few milliseconds. In this embodiment, the pulse of red light 56 is emitted during a common period (t3 to t4) of all integration times of the pixel rows 10(1), 10(2), 10(3) . . . 10(N-2), 10(N-1) and 10(N). That is, the pulse of red light 56 is emitted during a period when each of the pixel rows 10(1), 10(2), 10(3) . . . 10(N-2), 10(N-1) and 10(N) is being exposed to receive light.

Figure 5:
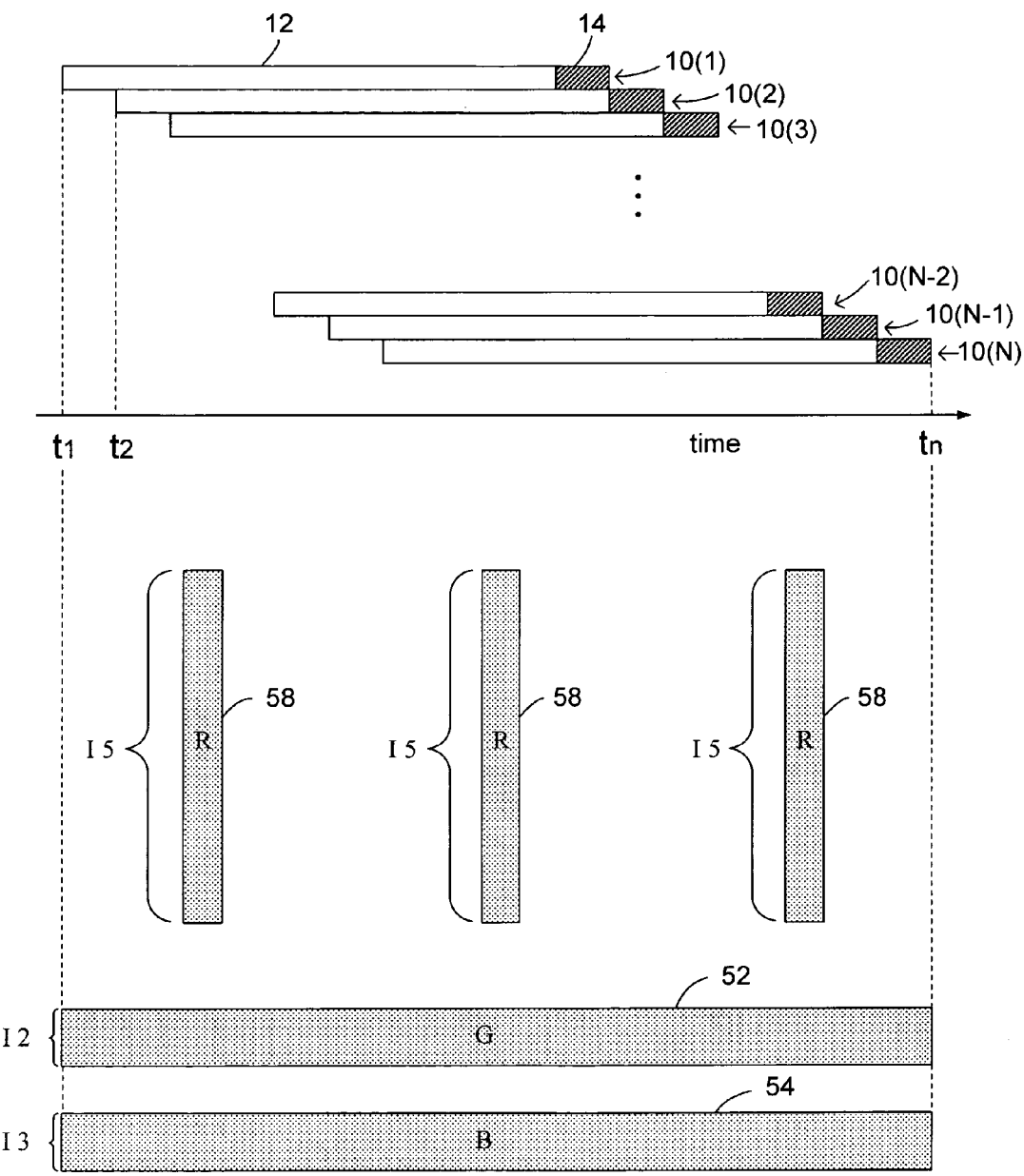
FIG. 5 illustrates pulsing only the red light emitted from a LED light source to produce multiple pulses of red light during an integration period to produce a flash of light in accordance with another embodiment of the invention.

In other embodiments, the LED light source 40 of the LED flash 22 may be operated to produce more than one pulse of red light during an integration period. As an example, in an embodiment, the LED light source 40 may be operated to produce three pulses of red light 58 during an integration period, as illustrated in FIG. 5. In this embodiment, the flash controller 34 drives the LED light sources 42 and 44 in continuous mode during an entire integration period to emit green light 52 with intensity I2 and blue light with intensity I3, respectively. The intensity I3 of the emitted blue light 54 may be substantially equal to the intensity I2 of the emitted green light 52. However, the flash controller 34 drives the LED light source 40 in a pulse mode during the integration period to emit three pulses of red light 58 with intensity I5, which is significantly higher than the intensity I2 of the emitted green light 52 and the intensity I3 of the emitted blue light 54. As illustrated in FIG. 5, the width of the pulses of red light 58 is substantially shorter than the integration period. In this embodiment, the pulses of red light 58 are emitted such that each of the pixel rows 10(1), 10(2), 10(3) . . . 10(N-2), 10(N-1) and 10(N) of the image sensor 26 is exposed to two of the three pulses of red light 58 during its integration time, which ensures that each pixel row is exposed to the same amount of red light during the integration period. Thus, the first pixel row 10(1) is exposed to the first two pulses of red light 58, while the last pixel row 10(N) is exposed to the last two pulses of red light 58. In other embodiments, the LED light source 40 of the LED flash 22 may be operated to produce more than three pulses of red light during an integration period. In fact, the LED light source 40 of the LED flash 22 may be operated to produce the same number of pulses of red light during an integration period as the number of pixel rows included in the image sensor 26.

Figure 6:
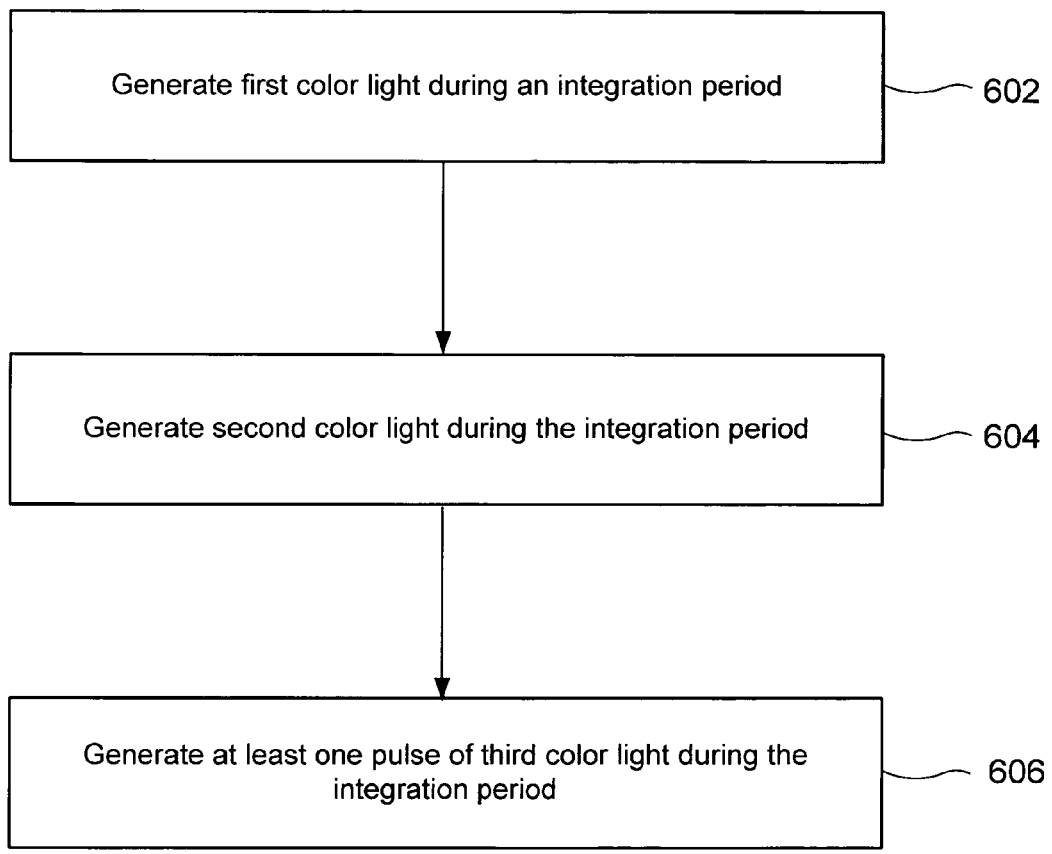
FIG. 6 is a flow diagram of a method for producing a flash of light in accordance with an embodiment of the invention.

A method for producing a flash of light in accordance with an embodiment of the invention is described with reference to a flow diagram of FIG. 6. At block 602, first color light is generated during an integration period. The first color light may be generated continuously during the entire integration period. At block 604, second color light is generated during the integration period. The second color light may also be generated continuously during the integration period. At block 606, at least one pulse of third color light is generated during the integration period. The pulse of third color light has a pulse width shorter than the integration period. The first color light, the second color light and the pulse of third color light are components of the flash of light. Although the blocks 602-606 are illustrated in FIG. 6 as being performed serially, the blocks 602-606 may be performed in parallel.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for producing a flash of light, said method comprising:
   generating first color light having a first intensity using a first driving current during an integration period;
   generating second color light having a second intensity using a second driving current during said integration period; and
   generating at least one pulse of third color light having a third intensity using a third driving current during said integration period, said pulse of third color light having a pulse width shorter than said integration period, said first color light, said second color light and said at least one pulse of third color light being components of said flash of light,
   wherein said third driving current is higher than said first driving current and said second driving current such that said third intensity is higher than said first intensity and said second intensity.

2. The method of claim 1 wherein said generating said first color light includes emitting said first color light from a first light emitting diode die, wherein said generating said second color light includes emitting said second color light from a second light emitting diode die, and wherein said generating said at least one pulse of third color light includes emitting said at least one pulse of third color light from a third light emitting diode die.

3. The method of claim 2 wherein said emitting said first color light from said first light emitting diode die includes emitting green light from said first light emitting diode die, wherein said emitting said second color light from said second light emitting diode die includes emitting blue light from said second light emitting diode die, and wherein said emitting said at least one pulse of third color light from said third light emitting diode die includes emitting said at least one pulse of red light from said third light emitting diode die.

4. The method of claim 1 wherein said generating said at least one pulse of third color light includes generating a single pulse of third color light during a portion of said integration period such that each pixel row of an associated image sensor is exposed to said single pulse of third color light during said integration period.

5. The method of claim 1 wherein said generating said at least one pulse of third color light includes generating multiple pulses of third color light during said integration period such that each pixel row of an associated image sensor is exposed to a predefined number of said multiple pulses of third light during said integration period, wherein said predefined number is smaller than the number of said multiple pulses of third color light.

6. The method of claim 1 wherein said generating said first color light includes continuously generating said first color light during said integration period.

7. The method of claim 6 wherein said generating said second color light includes continuously generating said second color light during said integration period.

8. method for producing a flash of light, said method compnsing:
   continuously generating first color light having a first intensity using a first driving current during an integration period;
   continuously generating second color light having a second intensity using a second driving current during said integration period; and
   generating at least one pulse of third color light having a third intensity using a third driving current during said integration period, said pulse of third color light having a pulse width shorter than said integration period, said third driving current being higher than said first driving current and said second driving current such that said third intensity is higher than said first intensity and said second intensity, said first color light, said second color light and said at least one pulse of third color light being components of said flash of light.

9. The method of claim 8 wherein said continuously generating said first color light includes continuously emitting said first color light from a first light emitting diode die, wherein said continuously generating said second color light includes continuously emitting said second color light from a second light emitting diode die, and wherein said generating said at least one pulse of third color light includes emitting said at least one pulse of third color light from a third light emitting diode die.

10. The method of claim 9 wherein said continuously emitting said first color light from said first light emitting diode die includes continuously emitting green light from said first light emitting diode die, wherein said continuously emitting said second color light from said second light emitting diode die includes continuously emitting blue light from said second light emitting diode die, and wherein said emitting said at least one pulse of third color light from said third light emitting diode die includes emitting said at least one pulse of red light from said third light emitting diode die.

11. The method of claim 8 wherein said generating said at least one pulse of third color light includes generating a single pulse of third color light during a portion of said integration period such that each pixel row of an associated image sensor is exposed to said single pulse of third color light during said integration period.

12. The method of claim 8 wherein said generating said at least one pulse of third color light includes generating multiple pulses of third color light during said integration period such that each pixel row of an associated image sensor is exposed to a predefined number of said multiple pulses of third light during said integration period, wherein said predefined number is smaller than the number of said multiple pulses of third color light.

13. An imaging device comprising:
   an electronic flash configured to produce a flash of light, said electronic flash comprising:
      a housing structure;
      a first light source connected to said housing structure, said first light source being configured to generate first color light during an integration period;
      a second light source connected to said housing structure, said second light source being configured to generate second color light during said integration period; and
      a third light source connected to said housing structure, said third source being configured to generate third color light during said integration period;
   a flash controller operatively connected to said first, second and third light sources of said electronic flash to activate said first light source using a first driving current to generate said first color light having a first intensity, to activate said second light source using a second driving current to generate said second color light having a second intensity, and to activate said third light source using a third driving current to generate said third color light having a third intensity, said third driving current being higher than said first driving current and said second driving current such that said third intensity is higher than said first intensity and said second intensity, said flash controller being configured to activate said third light source of said electronic flash to generate at least one pulse of third color light during said integration period, said pulse of third color light having a pulse width shorter than said integration period; and
   an image sensor configured to electronically capture an image of a scene of interest during said integration period.

14. The imaging device of claim 13 wherein said first, second and third light sources are light emitting diode dies.

15. The imaging device of claim 13 wherein said first light source is configured to generate green light, wherein said second light source is configured to generate blue light, and wherein said third light source is configured to generate red light.

16. The imaging device of claim 13 wherein said flash controller is configured to activate said third light source to generate a single pulse of third color light during a portion of said integration period such that each pixel row of said image sensor is exposed to said single pulse of third color light during said integration period.

17. The imaging device of claim 13 wherein said flash controller is configured to activate said third light source to generate multiple pulses of third color light during said integration period such that each pixel row of said image sensor is exposed to a predefined number of said multiple pulses of third light during said integration period, wherein said predefined number is smaller than the number of multiple pulses of third light.

18. The imaging device of claim 13 wherein said flash controller is configured to activate one of said first and second light sources to continuously generate one of said first color light and said second color light during said integration period.

* * * * *